United States Patent
Yamamoto et al.

(10) Patent No.: US 7,512,046 B2
(45) Date of Patent: Mar. 31, 2009

(54) OPTICAL DISK APPARATUS AND METHOD FOR CONTROLLING THE SAME

(75) Inventors: Ryosuke Yamamoto, Yokohama (JP); Kazuyo Umezawa, Yokohama (JP); Yoshiyuki Ishizawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 625 days.

(21) Appl. No.: 10/940,794

(22) Filed: Sep. 15, 2004

(65) Prior Publication Data

US 2005/0058037 A1  Mar. 17, 2005

(30) Foreign Application Priority Data

Sep. 16, 2003  (JP)  ............... 2003-323403

(51) Int. Cl.
*G11B 7/00*  (2006.01)
(52) U.S. Cl. ................... 369/53.22; 369/275.2
(58) Field of Classification Search ........... 369/53.2, 369/53.22, 53.23, 275.2
See application file for complete search history.

(56) References Cited

U.S. PATENT DOCUMENTS

| | | | | |
|---|---|---|---|---|
| 5,532,032 | A * | 7/1996 | Kawano et al. | 428/64.1 |
| 5,745,461 | A * | 4/1998 | Kawasaki | 369/53.23 |
| 5,903,531 | A * | 5/1999 | Satoh et al. | 369/44.29 |
| 6,747,931 | B1 * | 6/2004 | Park | 369/53.23 |
| 6,853,609 | B2 * | 2/2005 | Kusumoto et al. | 369/44.29 |
| 6,992,961 | B2 * | 1/2006 | Minase et al. | 369/53.23 |
| 7,061,850 | B1 * | 6/2006 | Irie et al. | 369/59.24 |
| 7,203,148 | B2 * | 4/2007 | Kim et al. | 369/53.22 |
| 2002/0105865 | A1 | 8/2002 | Kusumoto et al. | |
| 2002/0114915 | A1 | 8/2002 | Ohno et al. | |
| 2002/0150017 | A1 * | 10/2002 | Ono et al. | 369/53.23 |
| 2002/0159363 | A1 * | 10/2002 | Takeuchi | 369/53.23 |
| 2004/0240357 | A1 * | 12/2004 | Takeya | 369/53.22 |
| 2005/0128917 | A1 | 6/2005 | Ogawa et al. | |

FOREIGN PATENT DOCUMENTS

| | | |
|---|---|---|
| EP | 0 971 345 A1 | 1/2000 |
| EP | 1 548 731 A2 | 6/2005 |
| JP | 8-321129 | 12/1996 |
| JP | 10-302381 | 11/1998 |
| JP | 2000-311427 | 11/2000 |
| JP | 2001-34948 | 2/2001 |
| JP | 2001-266367 | 9/2001 |
| JP | 2001-283437 | 10/2001 |
| JP | 2001-307416 | 11/2001 |
| JP | 2002-117613 | 4/2002 |
| KR | 1998-028839 | 7/1998 |

* cited by examiner

*Primary Examiner*—Wayne R Young
*Assistant Examiner*—Linh T Nguyen
(74) *Attorney, Agent, or Firm*—Oblon, Spivak, McClelland, Maier & Neustadt, P.C.

(57) ABSTRACT

There are provided a mounting unit configured to selectively mount first and second optical disks in which characteristics of recording films are different from one another, and a discriminating unit configured to discriminate which of the first and second optical disks is mounted on the mounting unit based on a level of a reproduction signal which is obtained by reproducing innermost peripheral portion of the first or second optical disk mounted on the mounting unit.

8 Claims, 9 Drawing Sheets

| Information data in BCA-Data field | b7 | b6 | b5 | b4 | b3 | b2 | b1 | b0 |
|---|---|---|---|---|---|---|---|---|
| I8 | Book type | | | | Part version | | | |
| I9 | reserved | | | | | | | |
| I10 | reserved | | | | | | | |
| I11 | reserved | | | | | | | |

OPTICAL DISK APPARATUS AND METHOD FOR CONTROLLING THE SAME

CROSS-REFERENCE TO RELATED APPLICATIONS

This application is based upon and claims the benefit of priority from prior Japanese Patent Application No. 2003-323403, filed Sep. 16, 2003, the entire contents of which are incorporated herein by reference.

BACKGROUND OF THE INVENTION

1. Field of the Invention

The present invention relates to an optical disk apparatus carrying out recording/reproduction of information with respect to an optical disk, and a method for controlling the same, and in particular, to an optical disk apparatus that automatically discriminates a standard of the optical disk.

2. Description of the Related Art

As well known, in recent years, a technique of recording information at a high density has been developed, and an optical disk having a recording capacity of 4.7 GB (Giga Bytes) on one side has been put to practical use.

As this type of optical disk, there are various standards, for example, DVD-ROMs (Digital Versatile Disk—Read Only Memory) which are a reproduction-only type, DVD-RAMs (Random Access Memory), DVD-RWs (Rewritable), DVD+RWs which are a rewritable type, and DVD-Rs which a write-once type.

In an optical disk apparatus in which recording/reproducing can be carried out so as to selectively mount optical disks of several types of standards, there is provided a function in which the standard of a mounted optical disk is automatically discriminated by utilizing the fact that the light reflectance factors of the optical disks are different in accordance with the standard thereof, and adjustments or settings of respective portions are changed based on the discriminated result.

Incidentally, the current rewritable type optical disks having the same standard are further subdivided into a plurality of types in accordance with a characteristic of a recording film to be used.

Therefore, it is important for an optical disk apparatus to have a function of not only discriminating the basic standards of DVD-RAM, DVD-RW, DVD+RW, or the like, but also of automatically discriminating a characteristic of a recording film to be used, and of changing the adjustments and settings of the respective portions.

In Jpn. Pat. Appln. KOKAI Publication No. 2001-266367, there is disclosed a configuration in which focus-searching is applied to a mounted optical disk, and due to a light reflectance factor of the optical disk being measured based on a focus error signal obtained as a result thereof, a discrimination between a CD (Compact Disk)-ROM, a CD-R, and a CD-RW is carried out, and respective circuits for reproducing/recording are switched in accordance with a discrimination result.

However, in the Jpn. Pat. Appln. KOKAI Publication No. 2001-266367, there is no description about that a type based on a characteristic of a recording film which is used is further automatically discriminated with respect to rewritable type optical disks having a same standard.

BRIEF SUMMARY OF THE INVENTION

According to one aspect of the present invention, there is provided an optical disk apparatus comprising: a mounting unit configured to selectively mount first and second optical disks in which characteristics of recording films are different from one another; and a discriminating unit configured to discriminate which of the first and second optical disks is mounted on the mounting unit based on a level of a reproduction signal which is obtained by reproducing the innermost peripheral portion of the first or second optical disk mounted on the mounting unit.

According to another aspect of the present invention, there is provided a method for controlling an optical disk apparatus comprising: mounting selectively first and second optical disks in which characteristics of recording films are different from one another; and discriminating which of the first and second optical disks is mounted based on a level of a reproduction signal which is obtained by reproducing the innermost peripheral portion of the mounted first or second optical disk.

DETAILED DESCRIPTION OF THE INVENTION

Figure 1:
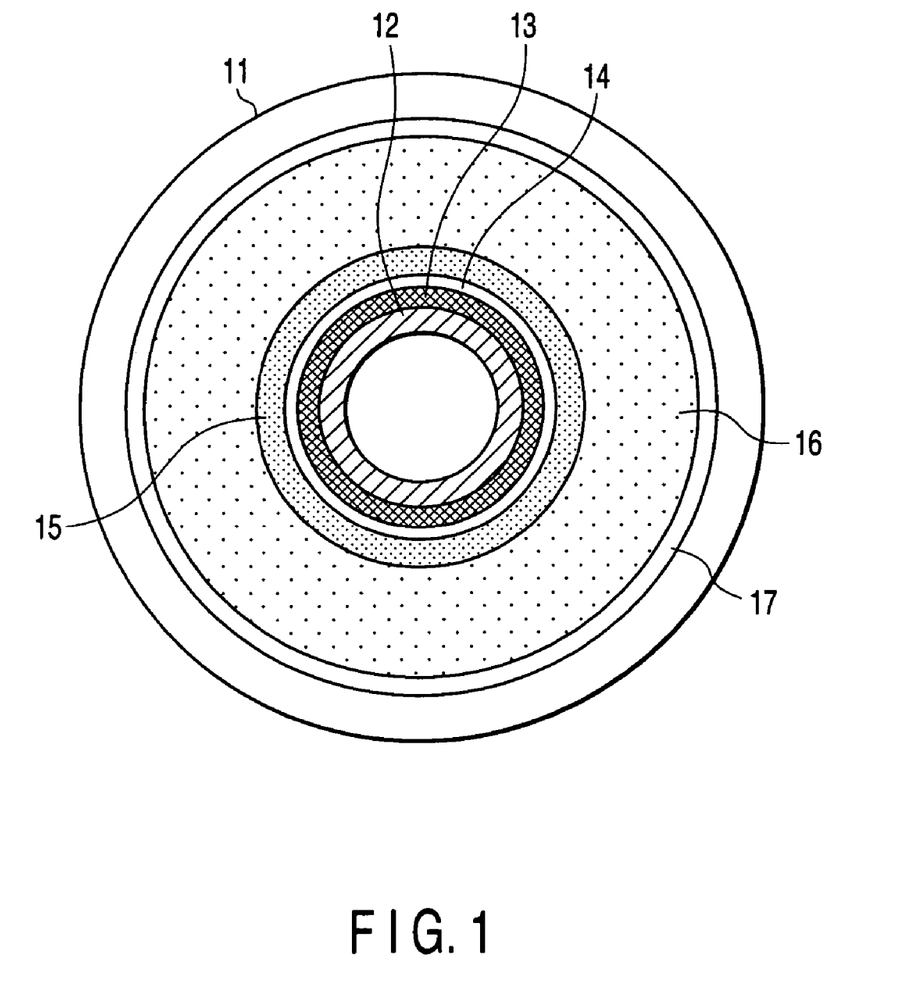
FIG. 1 shows one embodiment of the present invention, and is a diagram for explaining a configuration of an information recording area in a single layer rewritable type optical disk.

Hereinafter, an embodiment of the present invention will be described in detail with reference to the drawings. FIG. 1 shows a configuration of an information recording region on a single layer rewritable type optical disk 11. A BCA (Burst Cutting Area) 12, a system lead-in area 13, a connection area 14, a data lead-in area 15, a data area 16, and a data lead-out area 17 are formed from the inner peripheral side toward the outer peripheral side in the optical disk 11.

On the data lead-in area 15, the data area 16, and the data lead-out area 17, a land group system in which an information recording tracks are formed from concave/convex on an information recording layer is used. Further, recorded information are read from the BCA 12 at the innermost circle toward the outer peripheral side.

Figure 2:
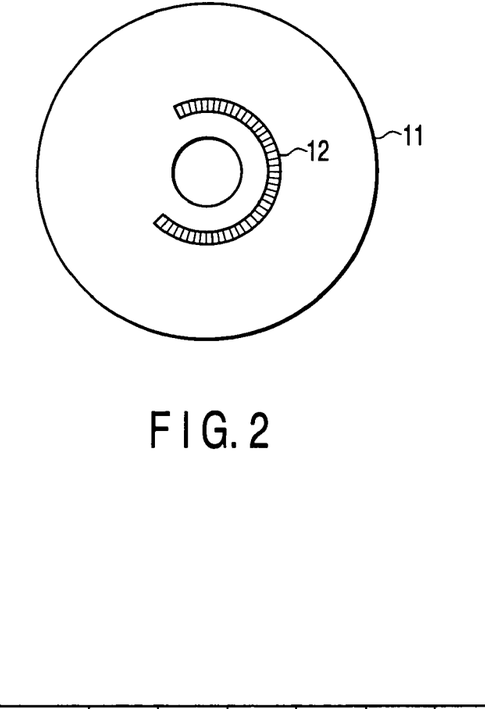
FIG. 2 is a diagram for explaining that information is written with barcode into a BCA in the optical disk.
Figure 3:
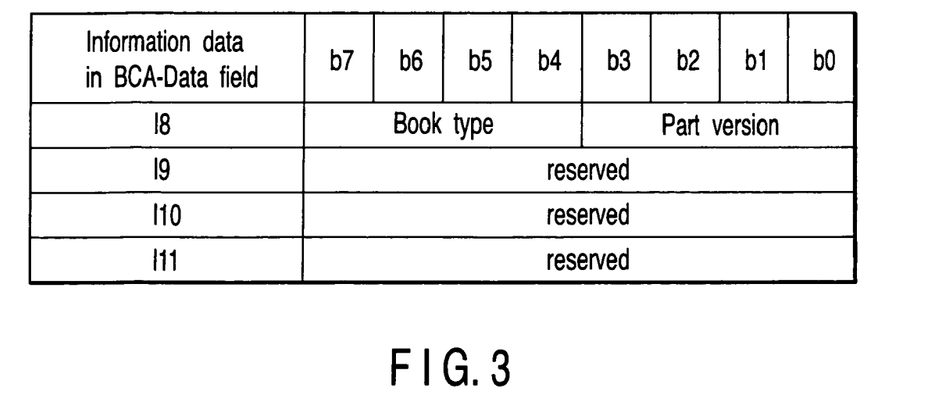
FIG. 3 is a diagram for explaining details of the information written with barcode into the BCA in the optical disk.

As shown in FIG. 2, information is written by barcode into the BCA 12 of the optical disk 11. As shown in FIG. 3, a book version of a standard specification and information on copyright protection are included in the information written by barcode.

In order to write information by barcode onto the BCA 12, there are two techniques. One technique involves removing a reflecting film and a recording film by laser trimming after the recording film on the entire optical disk 11 is initialized, and another technique involves utilizing a difference between the light reflectance factors in an initialized state and an uninitialized state.

Figure 4:
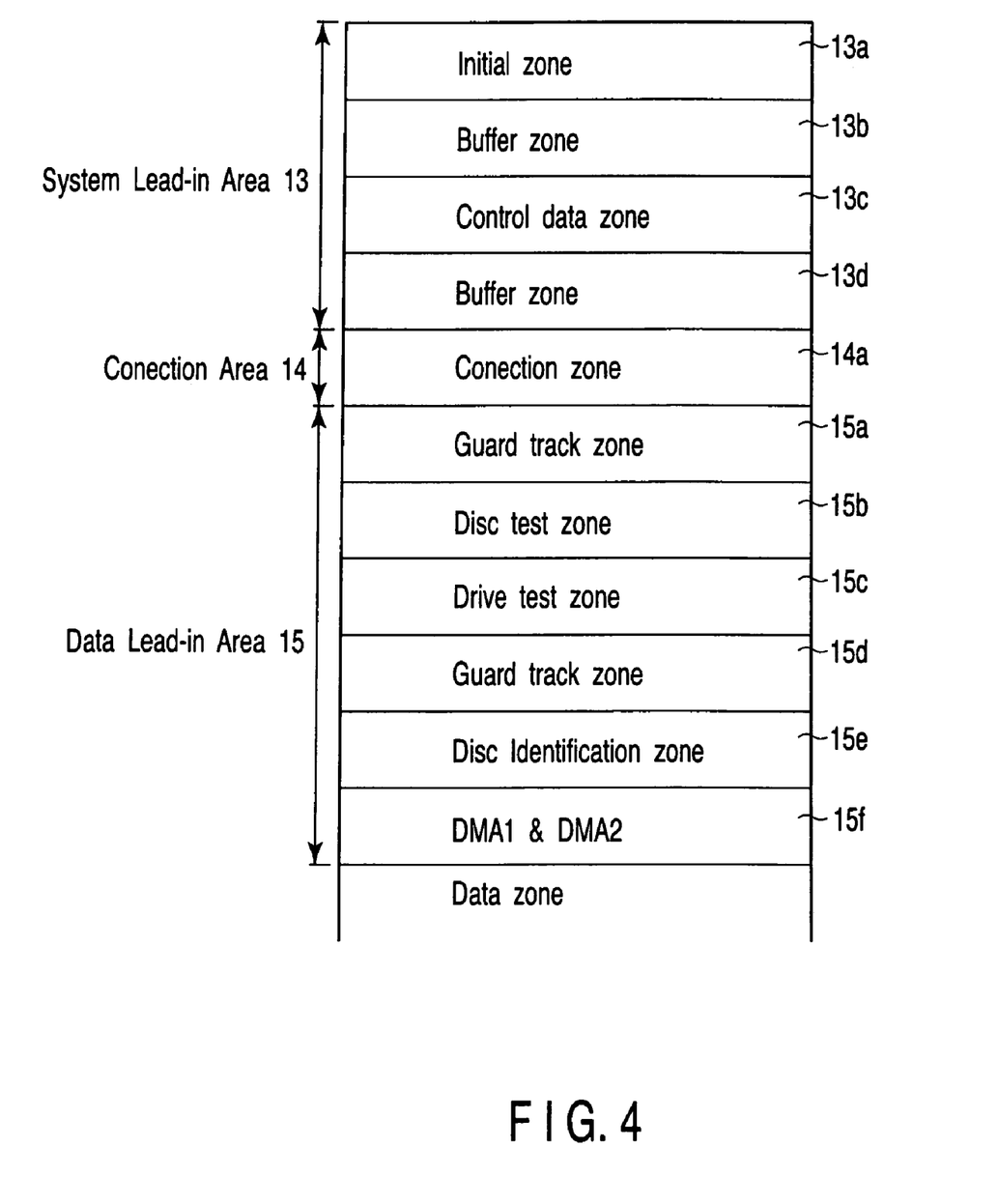
FIG. 4 is a diagram for explaining a data configuration of a system lead-in area, a connection area, and a data lead-in area in the optical disk.

FIG. 4 shows the data configuration of the above-described system lead-in area 13, connection area 14, and data lead-in area 15. On the system lead-in area 13, the four zones of an initial zone 13a, a buffer zone 13b, a control data zone 13c, and a buffer zone 13d are configured.

The connection area 14 is configuration from only a connection zone 14a. On the data lead-in area 15, the six zones of a guard track zone 15a, a disk test zone 15b, a drive test zone 15c, a guard track zone 15d, a disk identification zone 15e, and a DMA & DMA2 15f are configured.

Figure 5:
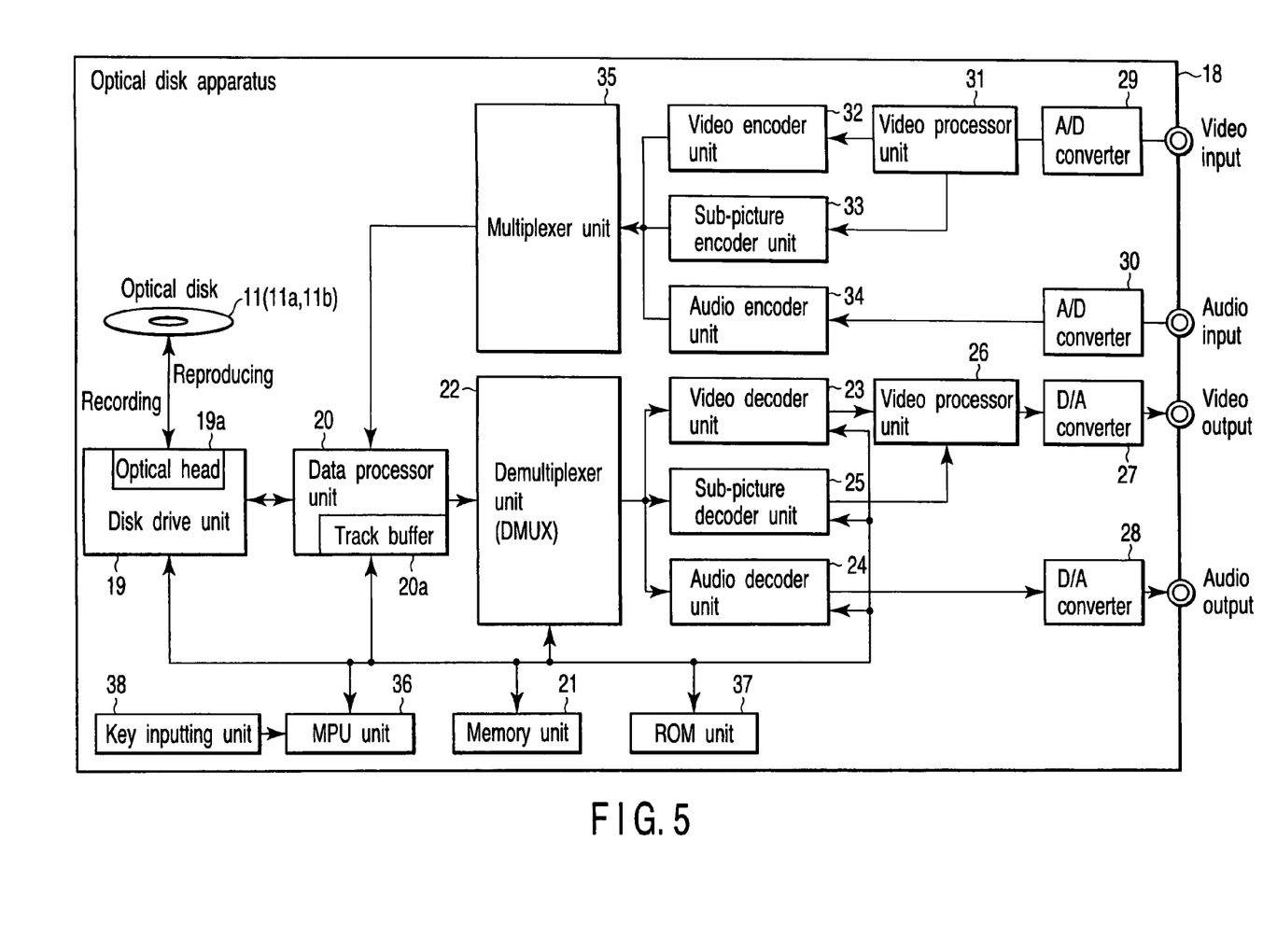
FIG. 5 is a block diagram for explaining an optical disk apparatus carrying out recording/reproducing of information onto the optical disk.

FIG. 5 shows an optical disk apparatus 18 carrying out recording/reproducing of information onto the optical disk 11 described above. Namely, the optical disk 11 is mounted on a disk drive unit 19. The disk drive unit 19 rotates the mounted optical disk 11 and carries out recording/reproduction of information with respect to the optical disk 11 by using an optical head 19a.

First, the information read at the disk drive unit 19 is supplied to a data processor unit 20 and error correction processing is applied thereto, and thereafter, the information is stored in a track buffer 20a. Of the information stored in the track buffer 20a, management information is recorded in a memory unit 21, and is used for the control at the time of reproduction and for managing various information, or the like.

Further, of the information stored in the track buffer 20a, information on a main video, audio, a sub-picture, or the like are supplied to a demultiplexer unit 22, and are separated into each of a main video pack, an audio pack, and a sub-picture pack. The information of the main video pack is supplied to a video decoder unit 23, and the information of the audio pack is supplied to an audio decoder unit 24, and the information of the sub-picture pack is supplied to a sub-picture decoder unit 25, and decoding processing is respectively carried out thereto.

Among these, the main video information decoded in the video decoder unit 23 and the sub-picture information decoded in the sub-picture decoder unit 25 are supplied to a video processor unit 26 and superimposing processing is applied thereto. Thereafter, the information is converted into analog information in a D/A (Digital/Analog) converter 27, and output as video signals to the exterior of the optical disk apparatus 18. Further, the audio information decoded in the above-described audio decoder unit 24 is converted into analog information in a D/A (Digital/Analog) converter 28, and is output as an audio signal to the exterior of the optical disk apparatus 18.

On the other hand, in the optical disk apparatus 18, video information and audio information is input from the exterior, and respectively converted into digital information in A/D (Analog/Digital) converters 29 and 30. Of the above, the video information digitized in the A/D converter 29 is supplied to a video processor unit 31, and a main video pack and a sub-picture pack are generated.

Then, the main video pack generated in the video processor unit 31 is encoded in a video encoder unit 32, and the sub-picture pack is encoded in a sub-picture encoder unit 33. Further, the audio information digitized in the A/D converter 30 is supplied to an audio encoder unit 34 and encoded for each audio pack.

Thereafter, the respective packs of the main video, the sub-picture, and the audio which have been respectively encoded in the respective encoder units 32, 33, and 34 are supplied to a multiplexer unit 35 and synthesized. The synthesized pack is recorded on the optical disk 11 via the disk drive unit 19 based on the control of the data processor unit 20.

A series of recording/reproduction operations as described above are generally controlled by an MPU (Micro Processing Unit) unit 36. The MPU unit 36 controls the respective units 19 to 25 so as to reflect the operating information input at a key inputting unit 38 based on a control program stored in a ROM unit 37.

Here, with respect to the rewritable type optical disk 11, various types of recording films have been developed in accordance with a target usage such as, for example, focusing on the reliability of the recorded/reproduced information, focusing on the number of rewritings, focusing on the recording speed, or the like.

Therefore, even if the rewritable type optical disks 11 have the same standard, the rewritable type optical disks 11 are further subdivided into a plurality of types in accordance with a characteristic of a recording film to be used.

To put it concretely, the optical disks 11 are divided into an optical disk (hereinafter, an H-L medium) 11a of a type of recording data due to a recording film having a characteristic that the light reflectance factor is high, and the result in which the reflected light is photoelectrically converted is made to be at an H (High) level being inverted to a characteristic that the light reflectance factor is low, and a result in which the reflected light is photoelectrically converted is made to be at an L (Low) level, and an optical disk (hereinafter, an L-H medium) 11b of a type of recording data due to a recording film having a characteristic that the light reflectance factor is low, and a result in which the reflected light is photoelectrically converted is made to be at an L (Low) level being inverted to a characteristic that the light reflectance factor is high, and a result in which the reflected light is photoelectrically converted is made to be at an H (High) level.

In the optical disk apparatus under the present circumstances, because the regenerated signal characteristic in the rewritable type optical disk 11 is strictly regulated, it is impossible to cope with the situation in which the optical disks 11 whose types of recording films are changed in accordance with a target usage are mixed, i.e., to carry out recording/reproduction so as to be adapted with respect to both the H-L medium 11a and the L-H medium 11b type optical disks.

Figure 6:
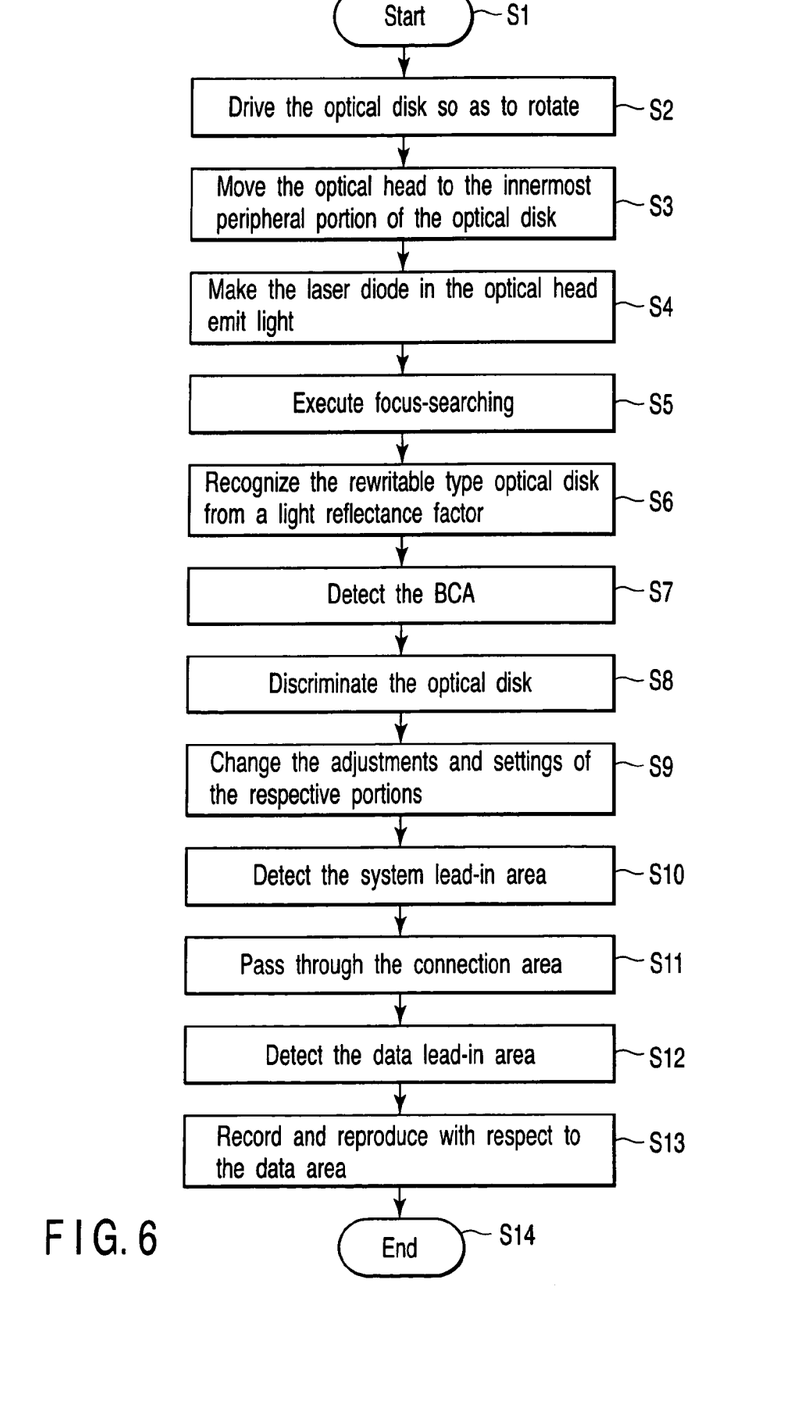
FIG. 6 is a flowchart for explaining the operations in which recording/reproducing processing is carried out by automatically discriminating an optical disk in the optical disk apparatus.

FIG. 6 is a flowchart showing the operations which are for automatically discriminating whether the mounted optical disk 11 is the H-L medium 11a or the L-H medium 11b in the optical disk apparatus 18 shown in the present embodiment, and for realizing recording/reproduction processing adapted to the optical disk 11, i.e., for making the H-L medium 11a and the L-H medium 11b to be able to be mixedly used.

First, due to the optical disk 11 being mounted on the disk drive unit 19 described above, the operation is started (step S1). The MPU unit 36 drives the optical disk 11 so as to rotate it in step S2, and moves the optical head 19a to the innermost peripheral portion of the optical disk 11 in step S3, and makes a laser diode in the optical head 19a emit light in step S4.

Then, the MPU unit 36 executes a so-called focus-searching in which a position of reflection on the surface of the optical disk 11 is found, and a focal point position is searched by moving an objective lens in the optical head 19a in a focusing direction in step S5. At the time of this focus-searching, the MPU unit 36 recognizes that the rewritable type optical disk 11 is mounted by carrying out measurement of a light reflectance factor from a level of a reproduction signal in step S6.

Thereafter, the MPU unit 36 detects the BCA 12 by moving the optical head 19 in the radial direction of the optical disk 11 in step S7, and discriminates whether the optical disk 11 is the H-L medium 11a or the L-H medium 11b in step S8. This discrimination is, although will be described later in detail, carried out based on a difference between the reproduction signal levels due to a difference between the reflectance factors of the recording films in the BCA 12, and a read result of the barcode information (Book Version) recorded in the BCA 12.

Next, in step S9, the MPU unit 36 changes adjustments and settings of the respective units so as to be adapted to the recording/reproduction of the optical disk 11 discriminated at the previous step S8, and detects the system lead-in area 13 by envelope detection in step S10, and passes through the connection area 14 in step S11, and detects the data lead-in area 15 in step S12. Thereafter, the MPU unit 36 executes recording/reproducing with respect to the data area 16 in step S13, and the operation is completed (step S14).

In the above operation, in particular, there is provided an advantage that an attempt can be made to shorten a starting time of the circuit unit reproducing the lead-in area because it is discriminated whether the optical disk 11 is the H-L medium 11a or the L-H medium 11b immediately after the BCA 12 is detected.

Here, as the technique by which it is discriminated whether the H-L medium 11a or the L-H medium 11b is carried out based on a level of a reproduction signal from the BCA 12, because the technique depends on a writing mode of barcode information in the BCA 12, there are two types.

Figure 7:
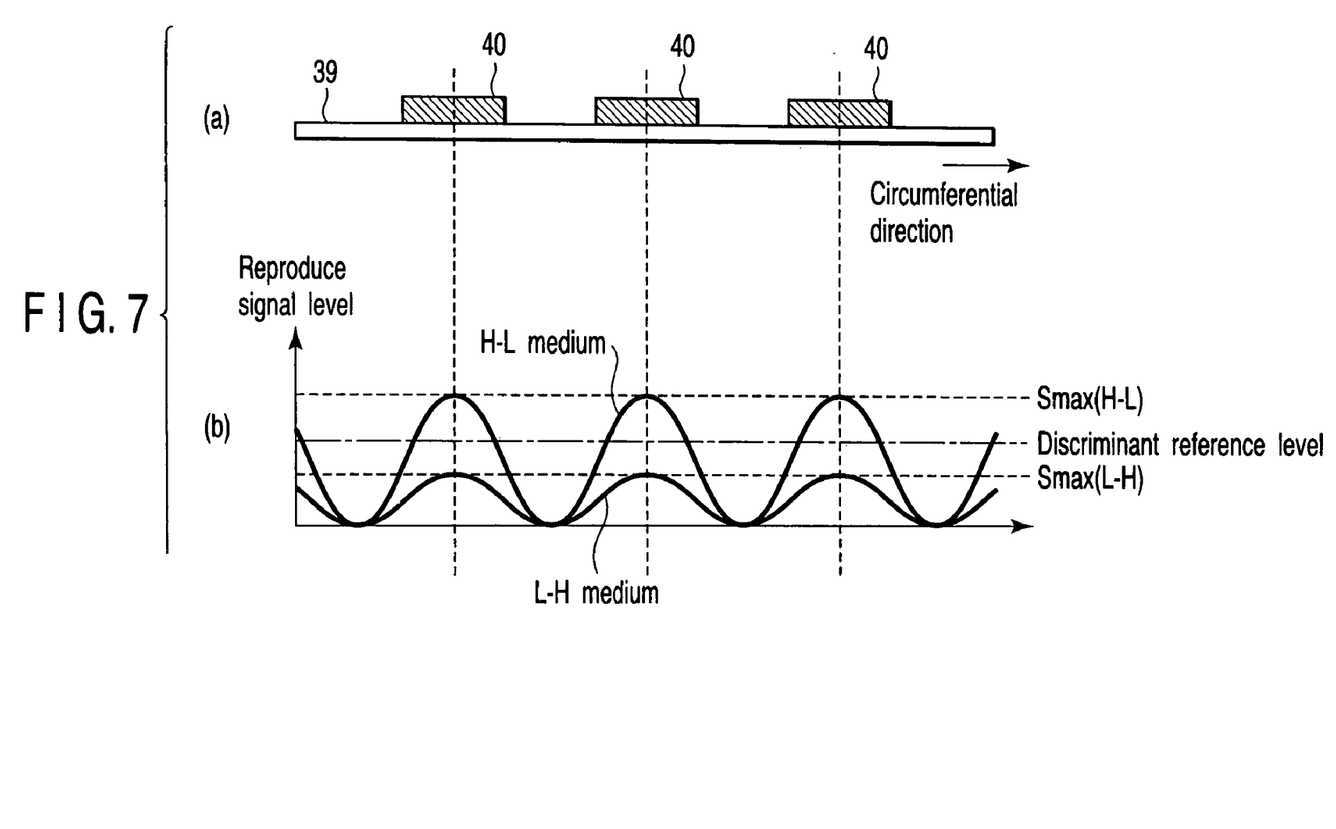
FIG. 7 is a diagram for explaining a relationship between one example of a writing mode of the barcode information in the BCA on the optical disk and a reproduction signal in the optical disk apparatus.

Mark (a) of FIG. 7 shows a mode in which barcode information is written by partially removing a recording film 40 after initialization processing in which the recording film 40 is formed on the entire surface of a disk substrate 39 is carried out.

In this case, the light reflectance factor of the recording film 40 of the H-L medium 11a is higher than the light reflectance factor of the recording film 40 of the L-H medium 11b, i.e., the level of the reproduction signal from the recording film 40 of the H-L medium 11a is made higher than the level of the reproduction signal from the recording film 40 of the L-H medium 11b. Further, Mark (b) of FIG. 7 shows the levels of the reproduction signals of the barcode information written into the BCAs 12 of the H-L medium 11a or the L-H medium 11b in such a mode.

Namely, because the light reflectance factor at a portion where there is no recording film 40 is substantially 0%, the intensity of the reflected light, i.e., the minimum level of the reproduction signal, is substantially made to be 0. Then, the maximum level Smax of the reproduction signal from a portion where there is the recording film 40 is to correspond to the light reflectance factor characteristic of the recording film 40, thus it is possible to precisely evaluate a difference between the light reflectance factors of the H-L medium 11a and the L-H medium 11b.

To put it concretely, discrimination between the H-L medium 11a and the L-H medium 11b is carried out by comparing the maximum level Smax of the reproduction signal with a discriminant reference level being provided between the maximum level Smax (H-L) of the reproduction signal of the H-L medium 11a and the maximum level Smax (L-H) of the reproduction signal of the L-H medium 11b.

Then, after the discrimination based on the reproduction signals is carried out in this way, due to the discriminated result and the Book Version information of the standard specification read from the BCA 12 being compared with one another, the reliability of the discriminated result is further improved.

Next, a mode in which barcode information is written by a difference between the initialization and uninitialization of a recording film will be described. In this mode, as shown in mark (a) of FIG. 8, a recording film 42 in an uninitialized state is formed on the entire surface of a disk substrate 41, and barcode information is written by partially initializing the recording film 42. In mark (a) of FIG. 8, the portions of the recording film 42 shown by the slanted lines are initialized portions.

Figure 8:
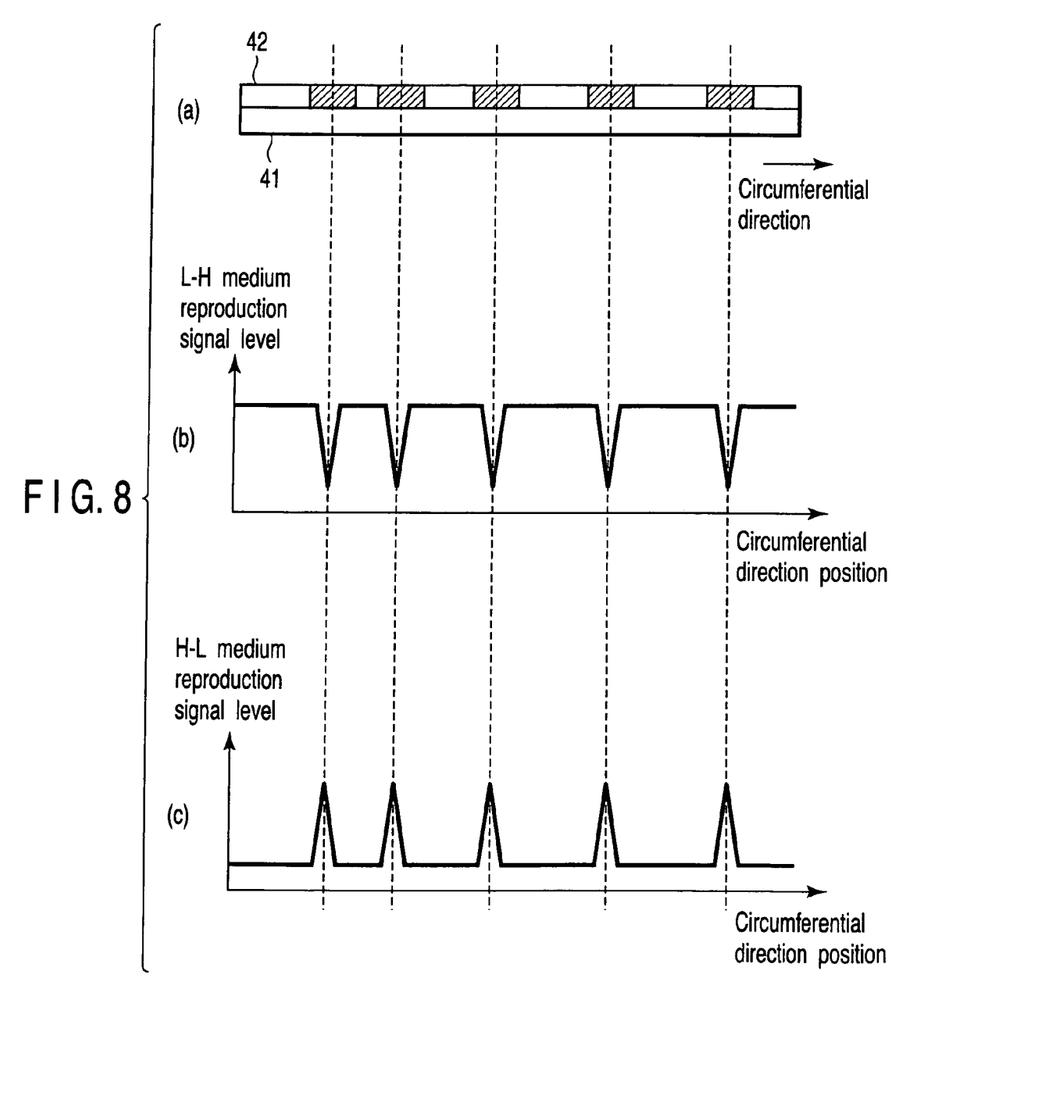
FIG. 8 is a diagram for explaining a relationship between another example of a writing mode of barcode information in the BCA on the optical disk and a reproduction signal in the optical disk apparatus.

In this case, most of the portions on the recording film 42 of the BCA 12 are in an uninitialized state. Therefore, as the reproduction signal of the BCA 12, a ratio at which the reproduction signal due to an uninitialized state is obtained is overwhelmingly higher than a ratio at which the reproduction signal due to an initialized state is obtained.

Namely, as shown in mark (b) of FIG. 8, in the case of the L-H medium 11b, the reflectance factor is high at the uninitialized portion, and the reproduction signal is made to be at H level, and the reflectance factor is low at the initialized portion, and the reproduction signal is made to be at L level. Therefore, a ratio at which the H level reproduction signal can be obtained is extremely higher than a ratio at which the L level reproduction signal can be obtained, and it can be discriminated to be the L-H medium 11b.

In contrast, as shown in mark (c) of FIG. 8, in the case of the H-L medium 11a, the reflectance factor is low at the uninitialized portion, and the reproduction signal is L level, and the reflectance factor is high at the initialized portion, and the reproduction signal is H level. Therefore, a ratio at which the L level reproduction signal can be obtained is extremely higher than a ratio at which the H level reproduction signal can be obtained, and it can be discriminated to be the H-L medium 11a.

Note that, even in a mode in which the entire recording film 42 before the barcode information is recorded thereon is made to be in an initialized state, and the barcode information is written by returning the recording film 42 to be in a partially uninitialized state, it can be discriminated whether the H-L medium 11a or the L-H medium 11b based on the reproduction signal levels in the same way as described above.

However, in this case, the discrimination result is opposite to the above description such that it is the H-L medium 11a when a ratio at which the H level reproduction signal can be obtained is made higher than a ratio at which the L level reproduction signal can be obtained, and it is the L-H medium 11b when a ratio at which the L level reproduction signal can be obtained is made higher than a ratio at which the H level reproduction signal can be obtained.

Then, when discrimination based on the reproduction signal levels is carried out in this way as well, due to the discriminated result and the Book Version information of the standard specification read from the BCA 12 being compared with one another, the reliability of the discriminated result can be further improved.

Figure 9:
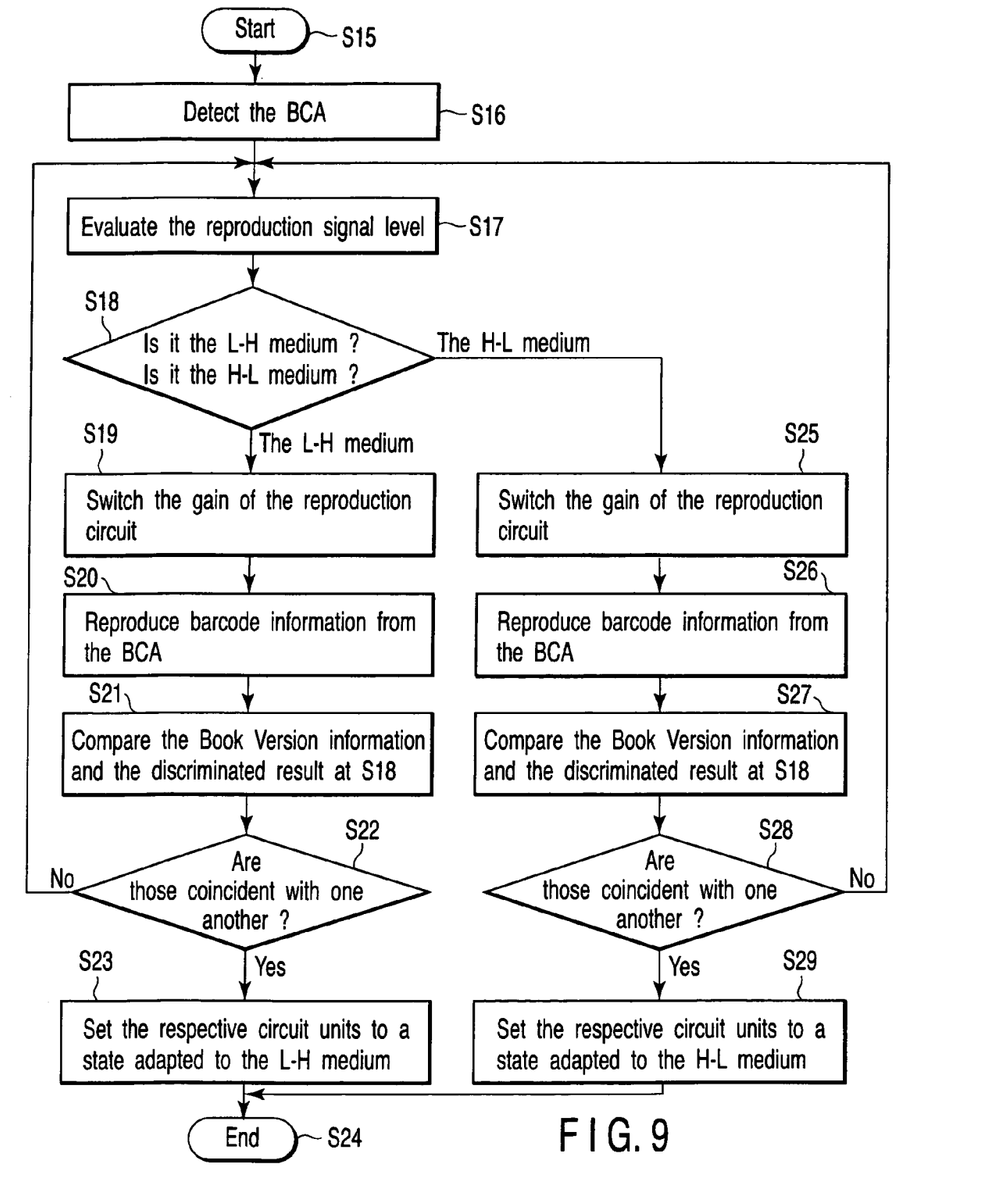
FIG. 9 is a flowchart for explaining a main portion of the operations in which recording/reproducing processing is carried out by automatically discriminating an optical disk in the optical disk apparatus in detail.

FIG. 9 is a flowchart for explanation of discriminating operations of the optical disk 11 described above, in particular, operations of the portions of steps S7 to S9 shown in FIG. 6 in detail. First, the operation is started (step S15), and when the BCA 12 is detected in step S16, the MPU unit 36 evaluates a reproduction signal level in step S17, and discriminates whether it is the H-L medium 11a or the L-H medium 11b in step S18.

Then, when discriminated that it is the L-H medium 11b, in step S19, the MPU unit 36 switches a gain of a reproduction circuit (for example, one part of a signal processing unit for recording or reproducing which has been built-in in the data processor unit 20) which amplifies a reproduction signal from the BCA 12, to a value adapted to the L-H medium 11b.

Thereafter, the MPU unit 36 reads the Book Version information which is the barcode information from the BCA 12, and reproduces it in step S20, and compares the Book Version information with the result discriminated in step S18 in advance in step S21, and it is discriminated whether they are coincident with one another or not in step S22.

Here, when discriminated that they are not coincident with one another (NO), the MPU unit 36 is made to return to the processing in step S17, and when discriminated that they are coincident with one another (YES), the above-described signal processing unit for recording or reproducing is set to a state adapted to the L-H medium 11b in step S23, and the operation is completed (step S24).

On the other hand, when discriminated that it is the H-L medium 11a at the above-described step S18, the MPU unit 36 switches a gain of a reproduction circuit (for example, one part of a signal processing unit for recording or reproducing which has been built-in in the data processor unit 20) which amplifies a reproduction signal from the BCA 12, to a value adapted to the H-L medium 11a in step S25.

Thereafter, the MPU unit 36 reads the Book Version information which is barcode information from the BCA 12, and reproduces it in step S26, and compares the Book Version information with the result discriminated in step S18 in advance in step S27, and discriminates whether or not they are coincident with one another in step S28.

Here, when discriminated that they are not coincident with one another (NO), the MPU unit 36 is made to return to the processing in step S17, and when discriminated that they are coincident with one another (YES), the above-described signal processing unit for recording or reproduction is set to a state adapted to the H-L medium 11a in step S29, and the operation is completed (step S24).

Figure 10:
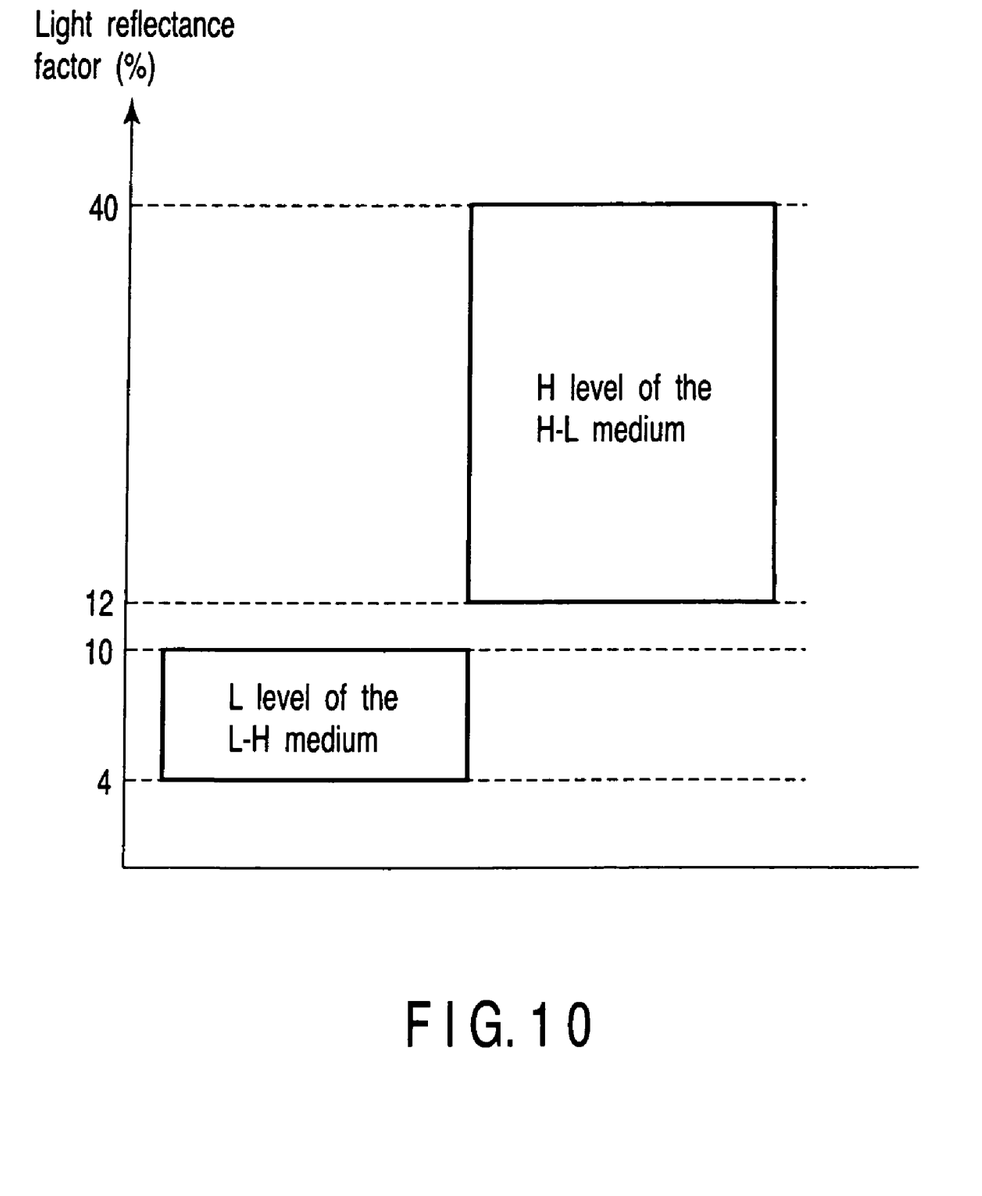
FIG. 10 is a diagram for explaining a setting state of a light reflectance factor in an initialized state in accordance with a type of the optical disk.

As described above, in order to carry out discrimination between the H-L medium 11a and the L-H medium 11b by using a level of a reproduction signal from the BCA 12, as shown in FIG. 10, a light reflectance factor of the L-H medium 11b in an initialized state is set to 4 to 10%, and a light reflectance factor of the H-L medium 11a in an initialized state is set to 12 to 40%.

The reason for this is that the ranges of the light reflectance factors in an initialized state of the both media (H level of the H-L medium 11a and L level of the L-H medium 11b) are not overlapped, i.e., the light reflectance factor at H level which is the initialized state of the H-L medium 11a must be higher than the upper limit of the light reflectance factor at L level which is the initialized state of the L-H medium 11b.

As used for discriminating means by the measurement of light reflectance factor under the present circumstances, because the reflectance factor of a phase-changing film used for the rewritable type optical disk 11 is generally lower than 40%, in order for the contrast of the reproduction signals to be good, the light reflectance factor at the L level is preferably as low as possible (close to 0%).

On the other hand, in the L-H medium 11b, the reproduction signals obtained from all areas are at L level in an initialized state, and when reproduction address information is taken into consideration, it is necessary to suppress the light reflectance factor at the L level to a level which can be reproduced.

In order to do that, when electric noise of the gain of the reproduction circuit is taken into consideration, a light reflectance factor of 5% or more is generally preferable, and when a reproduction signal having a light reflectance factor less than 5% is detected, it is necessary to improve the circuit which is difficult to realize under the present circumstances.

However, as the light reflectance factor at the L level is made higher in order to easily detect signals, although the level of the reproduction signal is increased, the entire signal level is uniformly increased, and a noise with respect thereto is increased as well, and therefore, the S/N ratio is decreased. Therefore, the light reflectance factor is preferably suppressed to about 8% or less. As described above, the light reflectance factor of the L-H medium 11b in an initialized state must be set to 4 to 10% in order to manufacture a medium providing a good signal characteristic.

Further, it has been understood that, in the H-L medium 11a as well, the light reflectance factor in an initialized state (H level) is required to be about 15% for improving a signal characteristic. However, even if it is less than or equal to about 15%, it is possible to manufacture a medium.

However, in order for the single layer H-L medium 11a and L-H medium 11b to be able to be mixedly used, because the light reflectance factor at the H level of the H-L medium 11a must be higher than 10% which is the light reflectance factor at the L level of the L-H medium 11b, the light reflectance factor at the H level of the H-L medium 11a is regulated to be 12% or more.

Further, an upper limit light reflectance factor at the H level of the H-L medium 11a may be about 40% of the upper limit of the light reflectance factor of a general phase-changing material. However, the upper limit light reflectance factor at the H level of the H-L medium 11a is regulated to be 40% thereof to leave a margin. As described above, due to a light reflectance factor in an initialized state of the single layer rewritable type optical disk 11 being regulated, a good reproduction signal quality can be maintained, and the H-L medium 11a and the L-H medium 11b can be precisely discriminated.

Note that the present invention is not limited to the above-described embodiment as is, and disclosed components can be modified and realized within a range which does not deviate from the gist of the present invention at the practical phase. Further, various inventions can be formed due to a plurality of disclosed components which have been disclosed in the embodiment described above being appropriately combined. For example, some of disclosed components may be eliminated from all of the disclosed components shown in the embodiment. Moreover, disclosed components ranging over the different embodiments may be appropriately combined.

What is claimed is:

1. An optical disk apparatus comprising:
 a mounting unit configured to selectively mount first and second optical disks in which characteristics of recording films are different from one another, and selectively mount the first optical disk on which information is recorded by varying a first recording film having a first light reflectance factor to a second light reflectance factor lower than the first light reflectance factor, and the second optical disk on which information is recorded by varying a second recording film having the second light reflectance factor to the first light reflectance factor higher than the second light reflectance factor;

a discriminating unit configured to discriminate which of the first and second optical disks is mounted on the mounting unit based on a level of a reproduction signal which is obtained by reproducing innermost peripheral portion of the first or second optical disk mounted on the mounting unit, discriminate which of the first and second optical disks is mounted based on a ratio at which a reproduction signal at a level corresponding to a region having the first light reflectance factor can be obtained and a ratio at which a reproduction signal at a level corresponding to a region having the second light reflectance factor can be obtained, by reproducing the first or second optical disk mounted on the mounting unit, discriminate to be the first optical disk when a ratio at which a reproduction signal at a level corresponding to a region having the first light reflectance factor can be obtained is higher than a ratio at which a reproduction signal at a level corresponding to a region having the second light reflectance factor can be obtained, and discriminate to be the second optical disk when a ratio at which a reproduction signal at a level corresponding to a region having the second light reflectance factor can be obtained is higher than a ratio at which a reproduction signal at a level corresponding to a region having the first light reflectance factor can be obtained; and a control unit configured to control a signal processing unit for recording or reproducing information based on a discrimination result of the discriminating unit.

2. An optical disk apparatus according to claim 1, wherein the control unit is configured to discriminate which of the first and second optical disks is mounted on the mounting unit by comparing the reproduced information and the discriminated result of the discriminating unit by reproducing information showing a type of the disk recorded on the first or second optical disk mounted on the mounting unit.

3. An optical disk apparatus according to claim 1, wherein a range of the first light reflectance factor of the first optical disk is set so as not to overlap with a range of the second light reflectance factor of the second optical disk.

4. An optical disk apparatus according to claim 1, wherein a range of the first light reflectance factor of the first optical disk is set to be about 12 to 40%, and a range of the second light reflectance factor of the second optical disk is set to be about 4 to 10%.

5. An optical disk apparatus according to claim 1, wherein information recorded on the first optical disk by varying the first recording film having the first light reflectance factor to the second light reflectance factor is recorded with barcode on a BCA of the first optical disk, and includes information showing a type of the disk itself, and information recorded on the second optical disk by varying the second recording film having the second light reflectance factor to the first light reflectance factor is recorded with barcode on a BCA of the second optical disk, and includes information showing a type of the disk itself.

6. An optical disk apparatus comprising:

a mounting unit configured to selectively mount first and second optical disks in which characteristics of recording films are different from one another, and selectively mount the first optical disk on which information is recorded due to a portion where there is a first recording film having a first light reflectance factor and a portion where there is no first recording film having a third light reflectance factor lower than the first and a second light reflectance factors, and the second optical disk on which information is recorded due to a portion where there is a second recording film having the second light reflectance factor lower than the first light reflectance factor and a portion where there is no second recording film having a third light reflectance factor lower than the first and second light reflectance factors; and a discriminating unit configured to discriminate which of the first and second optical disks is mounted on the mounting unit based on a level of a reproduction signal which is obtained by reproducing innermost peripheral portion of the first or second optical disk mounted on the mounting unit, discriminate which of the first and second optical disks is mounted based on whether a reproduction signal at a level corresponding to a region having the first light reflectance factor can be obtained or a reproduction signal at a level corresponding to a region having the second light reflectance factor can be obtained by reproducing the first or second optical disk mounted on the mounting unit, and discriminate between a reproduction signal at a level corresponding to a region having the first light reflectance factor and a reproduction signal at a level corresponding to a region having the second light reflectance factor by comparing a level of the reproduction signal obtained by reproducing the first or second optical disk mounted on the mounting unit with a reference level set in advance; and a control unit configured to control a signal processing unit for recording or reproducing information based on a discrimination result of the discriminating unit.

7. A method for controlling an optical disk apparatus comprising:

mounting selectively first and second optical disks in which characteristics of recording films are different from one another, the mounting selectively mounts the first optical disk on which information is recorded by varying a first recording film having a first light reflectance factor to a second light reflectance factor lower than the first light reflectance factor, and the second optical disk on which information is recorded by varying a second recording film having the second light reflectance factor to the first light reflectance factor higher than the second light reflectance factor;

discriminating which of the first and second optical disks is mounted based on a level of a reproduction signal which is obtained by reproducing an innermost peripheral portion of the mounted first or second optical disk, the discriminating including discriminating which of the first and second optical disks is mounted based on a ratio at which a reproduction signal at a level corresponding to a region having the first light reflectance factor can be obtained and a ratio at which a reproduction signal at a level corresponding to a region having the second light reflectance factor can be obtained by reproducing the mounted first or second optical disk, the discriminating further including discriminating to be the first optical disk when a ratio at which a reproduction signal at a level corresponding to a region having the first light reflectance factor can be obtained is higher than a ratio at which a reproduction signal at a level corresponding to a region having the second light reflectance factor can be obtained, and the discriminating further including discriminating to be the second optical disk when a ratio at which a reproduction signal at a level corresponding to a region having the second light reflectance factor can be obtained is higher than a ratio at which a reproduction signal at a level corresponding to a region having the first light reflectance factor can be obtained; and controlling a signal processing unit for recording or reproducing information based on a result of the discriminating.

8. A method for controlling an optical disk apparatus comprising:

selectively mounting first and second optical disks in which characteristics of recording films are different from one another, the selectively mounting including selectively mounting the first optical disk on which information is recorded due to a portion where there is a first recording film having a first light reflectance factor and a portion where there is no first recording film having a third light reflectance factor lower than the first and a second light reflectance factors, and selectively mounting the second optical disk on which information is recorded due to a portion where there is a second recording film having the second light reflectance factor lower than the first light reflectance factor and a portion where there is no second recording film having a third light reflectance factor lower than the first and second light reflectance factors; and discriminating which of the first and second optical disks is mounted on the mounting unit based on a level of a reproduction signal which is obtained by reproducing innermost peripheral portion of the first or second optical disk mounted on the mounting unit, the discriminating including discriminating which of the first and second optical disks is mounted based on whether a reproduction signal at a level corresponding to a region having the first light reflectance factor can be obtained or a reproduction signal at a level corresponding to a region having the second light reflectance factor can be obtained by reproducing the first or second optical disk mounted on the mounting unit, and discriminating between a reproduction signal at a level corresponding to a region having the first light reflectance factor and a reproduction signal at a level corresponding to a region having the second light reflectance factor by comparing a level of the reproduction signal obtained by reproducing the first or second optical disk mounted on the mounting unit with a reference level set in advance; and controlling a signal processing unit for recording or reproducing information based on a discrimination result of the discriminating.

* * * * *